United States Patent
Koba et al.

(10) Patent No.: US 10,218,037 B2
(45) Date of Patent: Feb. 26, 2019

(54) METHOD AND DEVICE FOR REGENERATING NICKEL METAL HYDRIDE BATTERY

(71) Applicant: PRIMEARTH EV ENERGY CO., LTD., Kosai-shi, Shizuoka (JP)

(72) Inventors: Daisuke Koba, Toyohashi (JP); Yasushi Nakagiri, Kyotanabe (JP); Tamotsu Fukuma, Kosai (JP); Shinichiro Ito, Kosai (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 0 days.

(21) Appl. No.: 15/640,561

(22) Filed: Jul. 2, 2017

(65) Prior Publication Data

US 2018/0013177 A1    Jan. 11, 2018

(30) Foreign Application Priority Data

Jul. 5, 2016   (JP) ................................. 2016-133147

(51) Int. Cl.
*H02J 7/00*     (2006.01)
*H01M 10/44*    (2006.01)
(Continued)

(52) U.S. Cl.
CPC ....... *H01M 10/441* (2013.01); *H01M 2/1077* (2013.01); *H01M 2/1223* (2013.01);
(Continued)

(58) Field of Classification Search
CPC ............. H02J 7/0021; H02J 2007/0037; H02J 2007/005; H02J 2007/0098; H02J 7/0014; H02J 7/0029; H02J 7/1461; H02J 2007/0039; H02J 2007/004; H02J 7/008; H02J 7/027
(Continued)

(56) References Cited

U.S. PATENT DOCUMENTS 5,811,959 A * 9/1998 Kejha ................... H02J 7/0018
                                                           320/126
9,413,041 B2   8/2016 Koba et al.
(Continued)

FOREIGN PATENT DOCUMENTS

JP       2014-186817 A    10/2014

*Primary Examiner* — Nghia M Doan
(74) *Attorney, Agent, or Firm* — Maschoff Brennan

(57) ABSTRACT

A method for regenerating a nickel metal hydride battery is provided. The nickel metal hydride battery includes a hydrogen absorbing alloy that serves as a negative electrode material and a safety valve that opens when an internal pressure of a battery case is greater than or equal to a predetermined pressure. The method includes connecting a plurality of nickel metal hydride batteries in parallel. Each nickel metal hydride battery is formed by integrating one or more battery cells. The method further includes overcharging the nickel metal hydride batteries by supplying current from a charge unit that is connected in parallel to the nickel metal hydride batteries. The method further includes, when each nickel metal hydride battery is overcharged, restoring a discharge reserve of a negative electrode by releasing at least some of an oxygen gas generated at a positive electrode out of the battery case through the safety valve.

9 Claims, 4 Drawing Sheets

(51) Int. Cl.
  *H01M 2/10* (2006.01)
  *H01M 2/12* (2006.01)
  *H01M 4/38* (2006.01)
  *H01M 10/34* (2006.01)
  *H01M 10/48* (2006.01)

(52) U.S. Cl.
  CPC ......... *H01M 4/383* (2013.01); *H01M 10/345* (2013.01); *H01M 10/482* (2013.01); *H02J 7/0013* (2013.01); *H01M 2220/20* (2013.01)

(58) Field of Classification Search
  USPC .................... 320/106, 117, 126–128, 147
  See application file for complete search history.

(56) References Cited

U.S. PATENT DOCUMENTS

| | | | |
|---|---|---|---|
| 2004/0137320 A1* | 7/2004 | Komori | H01M 2/0262 429/176 |
| 2014/0285157 A1* | 9/2014 | Koba | H01M 10/44 320/137 |
| 2015/0180092 A1* | 6/2015 | Nakagiri | H01M 10/441 320/118 |
| 2016/0233461 A1* | 8/2016 | Young | H01M 2/0207 |

\* cited by examiner

METHOD AND DEVICE FOR REGENERATING NICKEL METAL HYDRIDE BATTERY

CROSS-REFERENCE TO RELATED APPLICATIONS

This application is based upon and claims the benefit of priority from prior Japanese Patent Application No. P2016-133147, filed on Jul. 5, 2017, the entire contents of which are incorporated herein by reference.

BACKGROUND OF THE INVENTION

The present invention relates to a method and device for regenerating a nickel metal hydride battery that restores the capacity of a negative electrode.

A nickel metal hydride battery includes a positive electrode of which the main component is nickel hydroxide, a negative electrode of which the main component is a hydrogen absorbing alloy, and an alkaline electrolytic solution. In the nickel metal hydride battery, the negative electrode generally has a larger capacity than the positive electrode. Thus, the discharge capacity of the battery is limited by the capacity of the positive electrode (hereinafter referred to as positive electrode restriction). In a normal nickel metal hydride battery, the negative electrode includes a non-charged portion referred to as a charge reserve, which is chargeable but not charged when the positive electrode is fully charged, and a charged portion referred to as a discharge reserve, which is dischargeable but remains in the negative electrode when the positive electrode no longer includes a charged portion. In this manner, the positive electrode restriction limits increases in the internal pressure that results from overcharging and reactions caused by overcharging.

Hydrogen absorbed by the hydrogen absorbing alloy may permeate a battery case and leak out. The hydrogen absorbing alloy absorbs hydrogen when the battery is charged and releases hydrogen when the battery is discharged. When hydrogen permeates the battery case and leaks out, the hydrogen is released from the hydrogen absorbing alloy in order to maintain the hydrogen partial pressure in the case. This decreases the discharge reserve of the negative electrode. In particular, when the discharge reserve drastically decreases over a long usage period of the battery, the negative electrode restriction that limits the capacity of the negative electrode may decrease the capacity of the battery.

To solve this problem, Japanese Laid-Open Patent Publication No. 2014-186817 describes an example of a method for regenerating a battery that includes overcharging a nickel metal hydride battery and discharging hydrogen gas generated at a positive electrode out of a battery case through a safety valve arranged on the battery case. More specifically, when the nickel metal hydride battery is overcharged, a positive electrode reaction occurs in which the positive electrode generates oxygen and a negative electrode reaction occurs in which a hydrogen absorbing alloy absorbs hydrogen. When the oxygen generated at the positive electrode reacts with hydrogen absorbed by a hydrogen absorbing alloy, the hydrogen absorbing alloy returns to a state in which hydrogen is not absorbed in the hydrogen absorbing alloy. Thus, the discharge reserve does not increase. In the method described in Japanese Laid-Open Patent Publication No. 2014-186817, oxygen gas generated at the positive electrode is discharged from the safety valve. This limits the reaction of oxygen with the hydrogen absorbed in the hydrogen absorbing alloy and maintains a state in which hydrogen is absorbed in the hydrogen absorbing alloy. Further, Japanese Laid-Open Patent Publication No. 2014-186817 describes that the charge amount from when the safety valve opens is proportional to the hydrogen absorbing amount of the negative electrode and thus adjusts the charge amount in accordance with a target increase amount after opening the safety valve.

SUMMARY OF THE INVENTION

The regeneration method described in Japanese Laid-Open Patent Publication No. 2014-186817 is effective for restoring the discharge reserve. However, overcharging and regenerating a plurality of batteries one at a time in a mass production process is not realistic when taking into account the number of batteries that are subject to regeneration. Thus, a method that is presently employed includes forming a power supply by connecting a plurality of nickel metal hydride batteries in series and overcharging the power supply.

FIG. 7 shows the changes in the internal pressure over time when, for example, three battery modules $\alpha$, $\beta$, and $\gamma$ are connected in series and charged. The battery modules $\alpha$, $\beta$, and $\gamma$ are modules in which a plurality of battery cells, which are nickel metal hydride batteries, are connected in series. In FIG. 7, the horizontal axis represents time, and the vertical axis represents internal pressure. Further, "$\alpha$," "$\beta$," and "$\gamma$" denote internal pressure changing curves respectively changing in the internal pressure of the battery modules $\alpha$, $\beta$, and $\gamma$ relative to time. As shown in the graph of FIG. 7, in each of the battery modules $\alpha$, $\beta$, and $\gamma$, the safety valve opens at a different time because of differences in the usage history or the like. Thus, overcharging may be performed in accordance with the battery for which the restoration operation starts at the latest timing. That is, charging is performed until the safety valves of all of the batteries open (pre-valve-open charge), and charging is continued until a predetermined amount is charged from when the safety valves of the batteries are all open (post-valve-open charge). In this charging method, the battery module $\alpha$ in which the safety valve opens at the earliest timing is charged for a long time until the safety valve of the battery module $\gamma$ opens at the latest timing.

However, a decomposition reaction of the water contained in an electrolytic solution occurs at the negative electrode during overcharging. Thus, there is a tendency of the electrolytic solution to become insufficient when the battery is charged for a long time. Insufficient electrolytic solution may result in an increase in the resistance caused by a decrease in the area of contact area between the electrolytic solution with a positive electrode material and a negative electrode material. Further, insufficient electrolytic solution may result in micro-short circuiting caused by deposition of metal eluted in the electrolytic solution. This may lower the battery performance.

One aspect of the present invention is a method for regenerating a nickel metal hydride battery. The nickel metal hydride battery includes a hydrogen absorbing alloy that serves as a negative electrode material and a safety valve that opens when an internal pressure of a battery case is greater than or equal to a predetermined pressure. The method includes connecting a plurality of nickel metal hydride batteries in parallel. Each nickel metal hydride battery is formed by integrating one or more battery cells. The method further includes overcharging the nickel metal hydride batteries by supplying current from a charge unit that is connected in parallel to the nickel metal hydride batteries. The method further includes, when each nickel metal hydride battery is overcharged, restoring a discharge reserve of a negative electrode of the overcharged nickel metal hydride battery by releasing at least some of an oxygen gas generated at a positive electrode of the overcharged nickel metal hydride battery out of the battery case through the safety valve.

Another aspect of the present invention is a regeneration device for a nickel metal hydride battery. The nickel metal hydride battery includes a hydrogen absorbing alloy that serves as a negative electrode material and a safety valve that opens when an internal pressure of a battery case is greater than or equal to a predetermined pressure. Nickel metal hydride batteries are connected in parallel, and each nickel metal hydride battery is formed by integrating one or more battery cells. The regeneration device includes a charge unit connected in parallel to the nickel metal hydride batteries. The charge unit supplies current. The regeneration device further includes a control unit that controls supply and interruption of current from the charge unit. The control unit is configured to have the charge unit supply current and overcharge the nickel metal hydride batteries, and when each nickel metal hydride battery is overcharged, restore a discharge reserve of a negative electrode by releasing at least some of an oxygen gas generated at a positive electrode out of the battery case through the safety valve.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a method and device for regenerating a nickel metal hydride battery will now be described with reference to FIGS. 1 to 5. In the present embodiment, a battery to which the regeneration method and the regeneration device are applied is exemplified in a battery module formed by integrating a plurality of battery cells in a battery case. Multiple battery modules are combined to form an assembled battery. The assembled battery is used as a power source for an electric vehicle and a hybrid vehicle.

Figure 1:
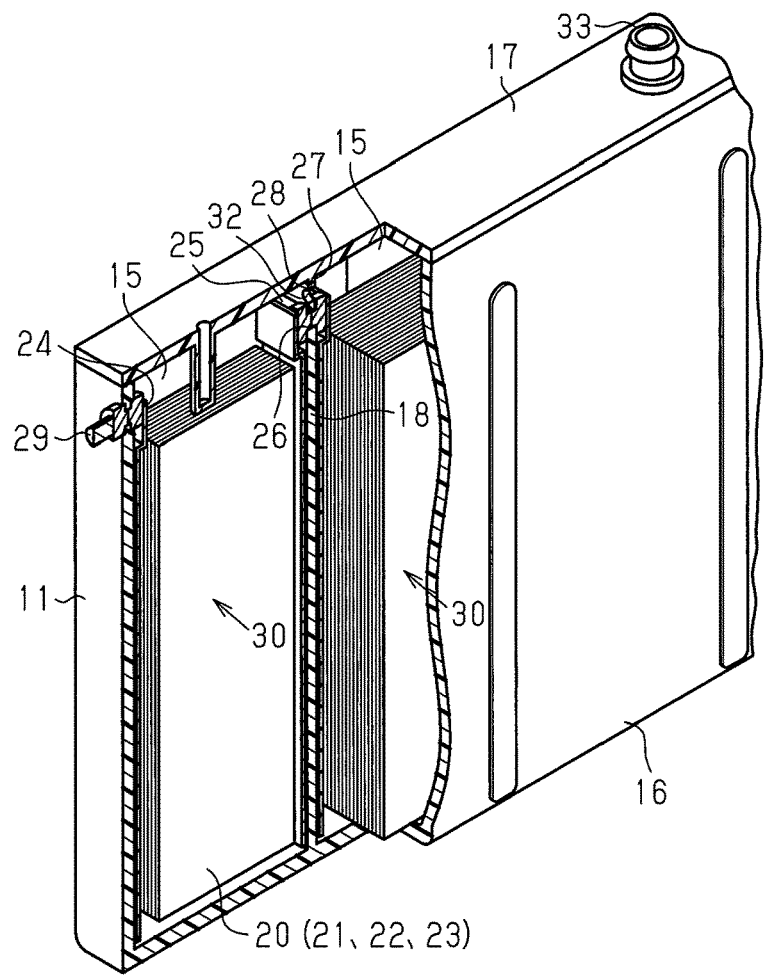
FIG. 1 is a cross-sectional perspective view schematically showing the structure of one example of a nickel metal hydride battery.

As shown in FIG. 1, a battery module 11, which is a nickel metal hydride battery, includes an integrated battery jar 16 and a lid 17 that seals an upper opening of the integrated battery jar 16. Partition walls 18 divide the inside of the integrated battery jar 16 into empty spaces. The integrated battery jar 15 and the lid 17 form battery jars 15 that function as battery cases.

Each battery jar 15 accommodates an electrode plate group 20 and an electrolytic solution (not shown). The electrode plate group 20 is formed by stacking positive electrode plates 21, negative electrode plates 22, and separators 23 located between the positive and negative electrode plates 21 and 22. The positive electrode plates 21, the negative electrode plates 22, the separators 23, and the electrolytic solution form power generation elements. Further, each battery jar 15 accommodates a current collecting plate 24 joined with the positive electrode plates 21 and a current collecting plate 25 joined with the negative electrode plates 22. The power generation elements and the current collecting plates 24 and 25 form a battery cell 30. The battery module 11 of the present embodiment includes six battery cells 30. Through holes extending through the partition walls 18 connect the current collecting plates 24 and 25, which are arranged along the partition walls 18, to electrically connect the six battery cells 30 in series. The power of the battery module 11 is retrieved by a positive electrode connection terminal 29 and a negative electrode connection terminal (not shown) that are arranged on the integrated battery jar 16. Two adjacent battery jars 15 are in communication with each other through a communication hole 32 extending through each partition wall 18 to allow gas to flow through the battery jars 15.

The lid 17 includes a safety valve 33 that opens when the internal pressure of the integrated battery jar 16 is greater than or equal to a valve opening pressure, which is a predetermined pressure. The battery module 11 includes a single safety valve 33. The safety valve 33 is closed when the internal pressure is normal, that is, less than the valve opening pressure. For example, when the generation of gas or the like increases the pressure in the battery jars 15 and causes the internal pressure to be greater than or equal to the valve opening pressure, the safety valve 33 opens and releases the gas out of the integrated battery jar 16.

A positive electrode material of the positive electrode plate 21 contains nickel hydroxide that serves as a positive electrode active material. A negative electrode material of the negative electrode plate 22 contains a hydrogen absorbing alloy (M) serving as a negative electrode active material. The hydrogen absorbing alloy absorbs hydrogen and becomes a metal hydride (MH). The electrolytic solution is, for example, an alkaline solution such as a potassium hydroxide solution.

Figure 2A:
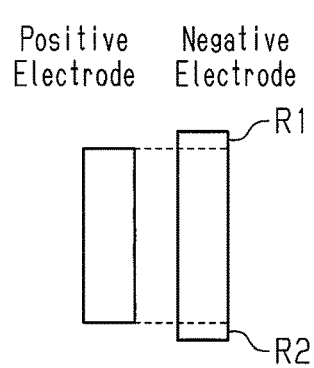
FIG. 2A is a schematic view showing the capacity balance of the nickel metal hydride battery and the battery capacity for positive electrode restriction.

The battery capacity of the nickel metal hydride battery will now be described with reference to FIG. 2. As shown in FIG. 2A, each battery cell 30 is a positive electrode restriction battery. Thus, the negative electrode has a larger capacity than the positive electrode in the battery cell 30. When the battery cell 30 is in an initial state and has not been used, the capacity of the negative electrode includes a charge reserve R1, which is the remaining charge capacity when the positive electrode is fully charged, and a discharge reserve R2, which is the remaining discharge capacity when the state of charge (SOC) of the positive electrode is 0%. The "fully charged" state of the positive electrode refers to a state in which the positive electrode active material of each battery cell 30 no longer includes a non-charged portion, that is, a state in which the SOC is 100%. Further, a state in which the SOC of the positive electrode is 0% refers to a state in which the positive electrode active material no longer includes a charged portion. With regard to positive electrode restriction, the state in which the SOC of the positive electrode is 100% is referred to as the fully charged state of the nickel metal hydride battery.

It is known that a slight amount of continuously gas leaks out of a typical nickel metal hydride battery. In the present embodiment, a slight amount of hydrogen permeates the integrated battery jar 16, the lid 17, and the like of the present embodiment and continues to leak out. In particular, this situation has a tendency to occur when the battery case is formed from a resin. When hydrogen leaks out in such a manner, hydrogen is released from the metal hydride (MH) of the negative electrode in accordance with the leakage amount of hydrogen to maintain the equilibrium of hydrogen partial pressure in the integrated battery jar 16. The release of hydrogen out of the battery module 11 in such a manner decreases the discharge reserve of the negative electrode.

Figure 2B:
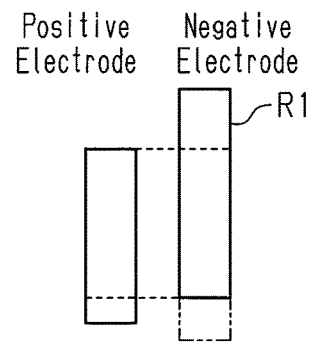
FIG. 2B is a schematic view showing the capacity balance of the nickel metal hydride battery and the battery capacity when the discharge reserve of the negative electrode is depleted.

FIG. 2B shows a state in which the discharge reserve R2 of the negative electrode is depleted. If the battery cell 30 is continuously used after the discharge reserve R2 is depleted and the SOC of the negative electrode becomes 0%, that is, if the SOC of the positive electrode is not 0% when the negative electrode no longer includes a charged portion, negative electrode restriction occurs and the capacity of the negative electrode restricts the battery capacity. As a result, the battery capacity is decreased by the negative electrode restriction.

In order to increase the discharge reserve R2, the battery module 11 is overcharged. In overcharging, charging is continued even after the positive electrode no longer includes a non-charged portion. Thus, as indicated in half reaction (1) shown below, a hydroxyl group of the electrolytic solution is decomposed and oxygen is generated. As indicated in half reaction (2) shown below, a reaction in which hydrogen is absorbed by the non-charged portion of the negative electrode active material, that is, the hydrogen absorbing alloy, progresses in the negative electrode. Further, as indicated by half reaction (3) shown below, at the same time as the reaction in which hydrogen is absorbed by the hydrogen absorbing alloy, the charged portion, that is, the hydrogen absorbing alloy (metal hydride) that absorbs hydrogen, reacts with oxygen and generate water. This returns the metal hydride (MH) to the hydrogen absorbing alloy (M). Thus, when the safety valve 33 is not open during overcharging, the negative electrode undergoes a reaction in which the non-charged portion is charged and a reaction in which the charged portion returns to a non-charged portion.

(Positive Electrode) $OH^- \rightarrow 1/4O_2 + 1/2H_2O + e^-$     (1)

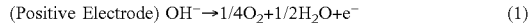

(Negative Electrode) $M + H_2O + e^- \rightarrow MH + OH^-$     (2)

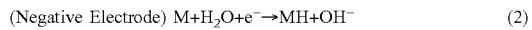

$MH + 1/4O_2 \rightarrow M + 1/2H_2O$     (3)

When the positive electrode generates hydrogen, the internal pressure increases. When the internal pressure becomes greater than or equal to the valve opening pressure, the safety valve 33 opens and releases oxygen gas to the outside. The release of oxygen gas limits the reaction of half reaction (3), that is, the reaction in which the charged portion returns to the non-charged portion. This maintains the hydrogen absorbing alloy that absorbs hydrogen in a state in which hydrogen is absorbed. When the negative electrode no longer includes a charged portion, the reaction shown in half reaction (2) progresses and obtains the discharge reserve R2.

Figure 3:
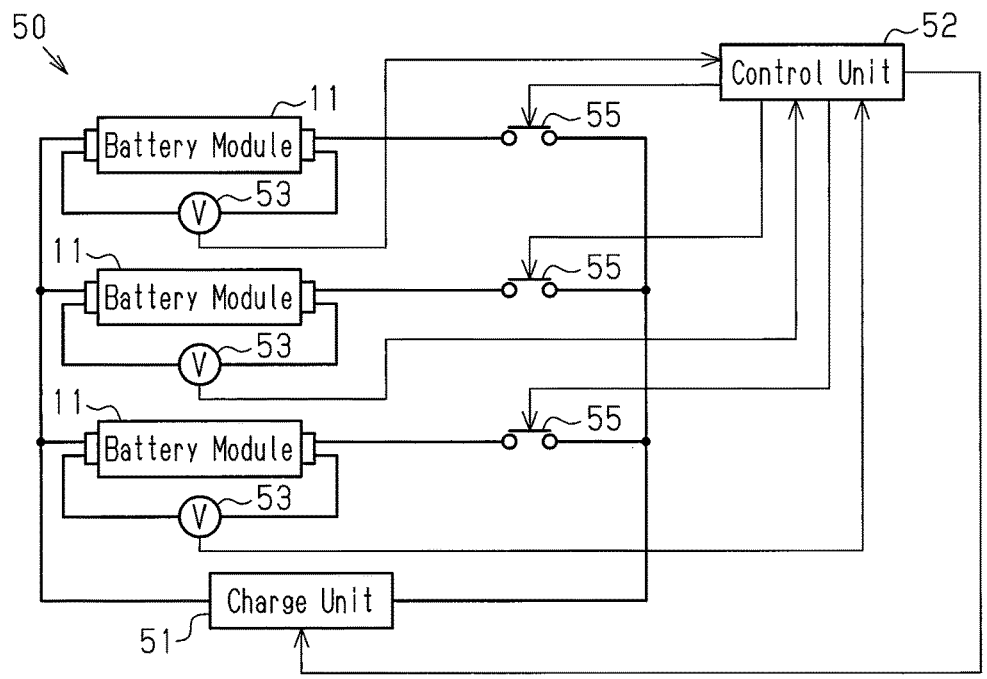
FIG. 3 is a schematic diagram showing the structure of one embodiment of a regeneration device for the nickel metal hydride battery.

The structure of the regeneration device of the battery module 11 will now be described with reference to FIG. 3. A regeneration device 50 includes a charge unit 51, a control unit 52, and voltage measurement units 53. In the present embodiment, three battery modules 11 are connected in parallel to the charge unit 51. The charge unit 51 supplies and charges the three battery modules 11 with a constant current. The control unit 52 controls the supplying and interruption of current from the charge unit 51.

The control unit 52 includes a calculator, a volatile memory, and a non-volatile memory that stores a program or the like for charge control. Further, each voltage measurement unit 53 is connected in parallel to a corresponding one of the battery modules 11. The voltage measurement unit 53 measures the voltage between the terminals of the battery module 11 during charging. The control unit 52 controls overcharging to restore the discharge reserve while obtaining the voltage value measured by the voltage measurement unit 53.

In addition, a switch 55 is arranged between each battery module 11 and the charge unit 51. The battery module 11 and the switch 55 are connected in series to each other. The switch 55 connects and disconnects the battery module 11 and the charge unit 51.

The non-volatile memory of the control unit 52 stores a first threshold value, which is used to determine a decrease in the positive electrode capacity, and a second threshold value, which is used to determine an internal short circuit. The control unit 52 compares the voltage value obtained from each voltage measurement unit 53 with the first and second threshold values. Based on the comparison result, the control unit 52 locates a battery module 11 having a decreased positive electrode capacity and a battery module 11 having an internal short circuit. The battery capacity cannot be restored through overcharging that restores the discharge reserve when a battery module 11 has a decreased positive electrode capacity or an internal short circuit. Thus, such a battery module 11 is not subject to overcharging.

The inventors of the present application have found that the voltage of a battery module 11 having a decreased positive electrode capacity is increased before the safety valve 33 opens as compared with a normal battery module 11 having a non-decreased positive electrode capacity. Further, the inventors of the present application have found that the voltage of a normal battery module 11 having a non-decreased positive electrode capacity decreases after the safety valve 33 opens. However, the voltage of the battery module 11 having a decreased positive electrode capacity is increased after the safety valve 33 opens as compared with a normal battery module 11. Thus, when a measurement voltage increase width ΔV per unit of time of a voltage value before valve opening of the battery module 11 during charging is greater than or equal to a predetermined voltage increase width ΔV1, the control unit 52 determines the battery module 11 as being a battery module 11 having a decreased positive electrode capacity. The voltage increase width ΔV1 can be set by measuring the voltage before valve opening of the battery module 11 having a decreased positive electrode capacity. Further, when a voltage value V after valve opening of the battery module 11 during charging becomes greater than or equal to a voltage increase determination value V2, the control unit 52 determines the battery module 11 as being a battery module 11 having a decreased positive electrode capacity. The voltage increase determination value V2 can be set by measuring the voltage before valve opening of the battery module 11 having a decreased positive electrode capacity.

The inventors of the present application have found that when an internal short circuit occurs in the battery module 11 (nickel metal hydride battery), the voltage of the battery module 11 before and after the safety valve 33 opens has a lower voltage than a normal battery module 11. Thus, when the voltage value V of a battery module 11 during charging becomes less than or equal to a predetermined voltage decrease determination value V3, the control unit 52 determines that an internal short circuit is occurring in the battery module 11. The voltage decrease determination value V3 can be set by measuring the voltage of the battery module 11 that has an internal short circuit.

Figure 4:
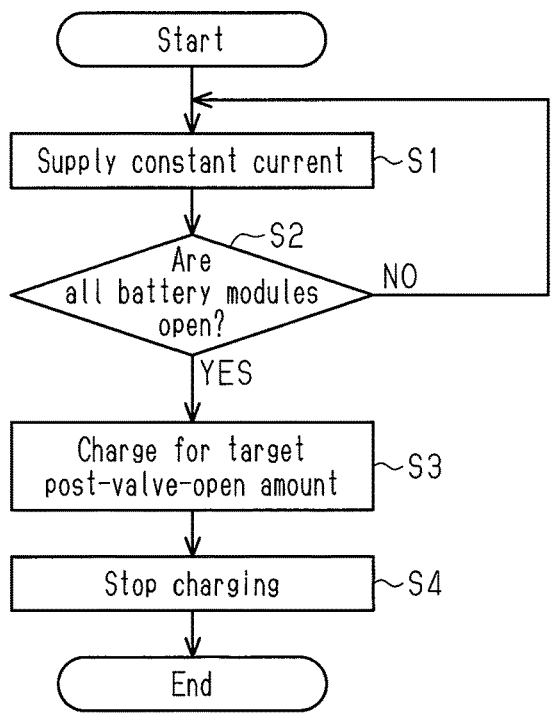
FIG. 4 is a flowchart showing the procedures of a method for regenerating the nickel metal hydride battery in one embodiment of the regeneration device for the nickel metal hydride battery.

The procedures of the regeneration method will now be described with reference to FIG. 4. First, the control unit 52 controls the charge unit 51 and supplies a constant current to each battery module 11 (step S1). The control unit 52 obtains the voltage value V from each voltage measurement unit 53 and determines whether or not the measurement voltage increase width ΔV per unit of time of the voltage value V before valve opening of the corresponding battery module 11 is greater than or equal to the voltage increase width ΔV1. When the control unit 52 determines that the measurement voltage increase width ΔV is greater than or equal to the voltage increase width ΔV1, the control unit 52 determines that the battery module 11 is a battery module having a decreased positive electrode capacity. Further, the control unit 52 obtains the voltage value V from each voltage measurement unit 53 and determines whether or not the voltage value is less than or equal to the voltage decrease determination value V3. When the control unit 52 determines that the voltage value V is less than or equal to the voltage decrease determination value V3, the control unit 52 determines that an internal short circuit is occurring in the battery module 11. The control unit 52 opens the switch 55, which is connected in series to the battery module 11 determined as being abnormal, and electrically disconnects the battery module 11 and the charge unit 51.

After the supply of constant current starts in such a manner, the control unit 52 determines whether or not the safety valves 33 of all the battery modules 11 are open (step S2). The open safety valve 33 of the battery modules 11 may be visually checked by an operator. Alternatively, a flow meter that measures the flow rate of gas may be connected to each safety valve 33 so that an operator or the control unit 52 can determine that the valve is open when the flow rate of gas is greater than or equal to a predetermined amount. Opening of the safety valve 33 limits the reaction of half reaction (3) and thus starts increasing the discharge reserve.

When the safety valves 33 of all of the battery modules 11 are not open (step S2: NO), the control unit 52 continues to supply a constant current from the charge unit 51 (step S1). When the safety valves 33 of all of the battery modules 11 are open (step S2: YES), the control unit 52 performs charging with the charge unit 51 for a target post-valve-open charge amount (step S3). When charging is continued in correspondence with the target post-valve-open charge amount, the control unit 52 stops charging with the charge unit 51 (step S4). When the battery modules 11 are charged in correspondence with the post-valve-open target charge amount after the safety valves 33 open, the discharge reserve is increased in correspondence with a target discharge reserve.

The inventors of the present application have found that the charge amount after valve opening is correlated with the capacity of the discharge reserve that is increased through overcharging. Thus, the post-valve-open target charge amount can be set as follows. For example, the correlation between the charge amount after valve opening and the discharge reserve is calculated in advance through experiments or the like, and the target discharge reserve is determined during regeneration. Further, the charge amount after valve opening corresponding to the target discharge reserve (post-valve-open target charge amount) is calculated based on the correlation between the charge amount after valve opening calculated in advance and the discharge reserve.

In parallel with charging after valve opening, the control unit 52 obtains the voltage value V from each voltage measurement unit 53 while the charge unit 51 supplies constant current to each battery module 11. Then, the control unit 52 determines whether or not the voltage value after valve opening of the corresponding battery module 11 is greater than or equal to the voltage increase determination value V2. When the control unit 52 determines that the voltage value after valve opening is greater than or equal to the voltage increase determination value V2, the control unit 52 determines that the battery module 11 is an abnormal battery module having a decreased positive electrode capacity. Further, the control unit 52 obtains the voltage value V from the voltage measurement unit 53 and determines whether or not the voltage value is less than or equal to the voltage decrease determination value V3. When the control unit 52 determines that the voltage value V is less than or equal to the voltage decrease determination value V3, the control unit 52 determines that an internal short circuit occurs in the battery module 11. In addition, the control unit 52 stops charging the battery module 11 that has been determined as having an internal short circuit by opening the switch 55 connected in series to the battery module 11.

Figure 5:
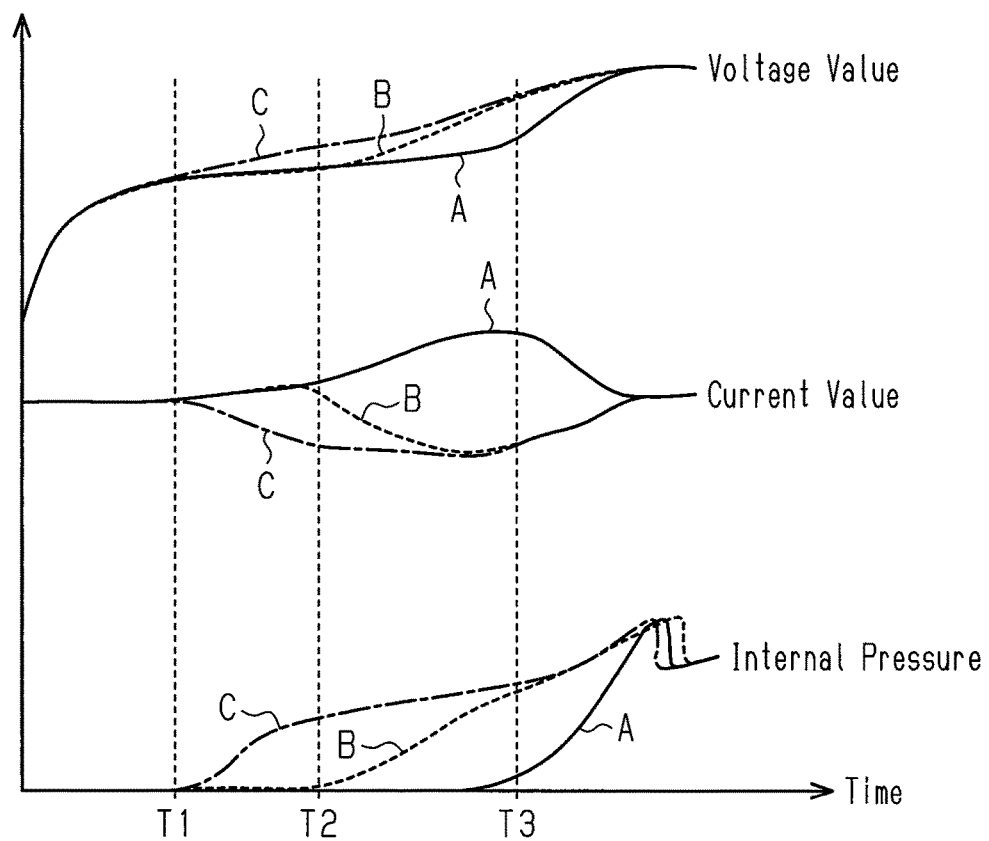
FIG. 5 is a graph showing changes in the internal pressure, the current value, and the voltage value of the nickel metal hydride battery as time elapses in the regeneration method using one embodiment of the regeneration device for the nickel metal hydride battery.

The internal pressure change, current change, and voltage change of the battery module 11 during regeneration will now be described with reference to FIG. 5. In the present embodiment, negative electrode restriction is imposed on the battery capacities of the battery modules C and B, and the battery capacity increases in order from the battery module C to the battery module B and then the battery module A.

In the battery module C having the largest capacity, overcharging starts at the earliest timing (time T1). The voltage at the battery module C increases as compared with the other battery modules A and B, and current flowing through the battery module C decreases. Further, in the battery module C, oxygen is generated at the positive electrode, and a decomposition reaction of water occurs at the negative electrode. However, the current flowing through the battery module C is small. Thus, the speed of a battery reaction at the negative electrode decreases as a whole, and the progress speed of the water decomposition reaction decreases.

Further, the decrease in the current flowing through the battery module C causes the current flowing through the battery modules A and B to be larger than the current flowing through the battery module C. This increases the charge speeds of the battery modules A and B.

Subsequently, overcharging starts at the battery module B having the second smallest capacity (time T2). The voltage at the battery module B increases as compared with the battery module A, and the current flowing through the battery module B decreases. The value of the current flowing through the battery module B converges to the current value of the battery module A. This further increases the current flowing through the battery module A and further increases the charge speed of the battery module A. In addition, since oxygen is generated at the positive electrode of the battery module B, the internal pressure increases.

Then, overcharging starts at the battery module A having the smallest capacity (time T3). The voltage at the battery module A increases and converges to the voltage value of the battery modules B and C. The current flowing through the battery module A decreases, and the current flowing through the battery modules B and C increases. Further, the oxygen generated at the positive electrode of the battery module B increases the internal pressure.

The voltage value of all the battery modules A to C converges to a predetermined voltage value that is the highest voltage value after charging starts, and the current value converges to a predetermined current value. Subsequently, when the internal pressure of the battery modules A to C reaches a predetermined pressure, the safety valves 33 open and release oxygen gas. This decreases the internal pressure. Then, the discharge reserve is increased in correspondence with a predetermined amount by continuing charging for a predetermined time.

Thus, when the battery modules A to C are connected in parallel and charged as described above, the difference between the valve opening timings of the battery modules A to C is narrowed. This reduces the time during which the battery module A having the smallest capacity waits for the valve opening of the other battery modules B and C. Thus, a situation in which the electrolytic solution of the battery module A becomes insufficient is avoided. In the battery module 11 of the present embodiment, the communication hole 32 of the partition wall 18 allows gas to flow between the two adjacent battery jars 15 of the same battery module 11. Accordingly, regardless of the battery jar 15 in which gas is generated during overcharging, the charge amount of the negative electrode starts to become uniform before the safety valves 33 open. Subsequently, the safety valves 33 open and uniformly restore the discharge reserves of the batteries of the battery jars 15.

As described above, the above embodiment has the following advantages.

(1) The battery modules 11 are connected in parallel and supplied with current from the charge unit 51. When charging starts, the batteries are fully charged from the ones having decreased battery capacities. Further, the battery modules 11 are overcharged by continuously charging of the fully charged batteries. During overcharging, the positive electrode generates oxygen gas. When at least some of the hydrogen gas is released from the safety valve 33, hydrogen is absorbed by the hydrogen absorbing alloy of the negative electrode and the capacity of the negative electrode is restored.

In addition, the voltage becomes higher and the supplied current becomes smaller in a fully charged battery module 11 than a battery module 11 that is not fully charged. This slows the progress of a decomposition reaction of water in the electrolytic solution, which is a reaction that occurs during overcharging, in the fully charged battery module 11. While the fully charged battery module 11 is being overcharged, the current supplied to the battery module 11 that is not in the fully charged state becomes large. As a result, the speed of charging the battery module 11 increases.

Thus, even when there is a difference in battery capacity between the battery modules 11 before charging, the speed for charging the battery module 11 having a large battery capacity can be increased while charging is being performed. This allows the valve opening timings of batteries to become closer than when the battery modules 11 are connected in series. Thus, when the battery modules 11 are charged simultaneously, for example, even if charging is continued in correspondence with a predetermined charge amount from when the safety valves 33 of all the battery modules 11 open, the valve opening timings of the batteries become close. This shortens the charge time of the battery having the earliest valve opening timing among the batteries. Thus, the battery regeneration becomes efficient without lowering the battery performance that would result from insufficient electrolytic solution. Since the waiting time from when the first safety valve opens to when the last safety valve opens, the entire charge time is shortened.

(2) The inventors of the present application have found that a nickel metal hydride battery converges to a constant voltage value when fully charged. Further, constant current charging is performed on the battery modules 11 that are connected in parallel. Thus, as long as the timing at which all the battery modules 11 open is determined, measurement of the elapsed time from the timing adjusts the charge amount (discharge reserve) of each nickel metal hydride battery, that is, the restoration charge amount of the negative electrode.

(3) The inventors of the present application have found that the voltage increase width becomes excessive before the safety valve 33 opens during charging in the battery module 11 having a decreased positive electrode capacity as compared with a normal battery module 11. The above embodiment stops charging a battery module 11 indicating an abnormal behavior in which the measurement voltage increase width ΔV becomes greater than or equal to the predetermined voltage increase width ΔV1. Thus, in the charge process that restores the discharge reserve, the battery module 11 in which the battery capacity does not restore is not subject to processing.

(4) The inventors of the present application have found that the voltage increases after the safety valve opens during charging in the nickel metal hydride battery having a decreased positive electrode capacity as compared with a normal nickel metal hydride battery. The above embodiment stops charging a battery module 11 indicating an abnormal behavior in which the voltage value V1 becomes greater than or equal to the voltage increase determination value V2. Thus, in the charge process that restores the discharge reserve, the battery module 11 in which the battery capacity does not restore is not subject to processing.

(5) The inventors of the present application have found that the voltage decreases during charging in the battery module 11 that undergoes an internal short circuit as compared with a normal battery module 11. The above embodiment stops charging a battery module 11 indicating an abnormal behavior in which the voltage value V becomes greater than or equal to the predetermined voltage decrease determination value V3. Thus, in the charge process that restores the discharge reserve, the battery module 11 in which the battery capacity does not restore is excluded from the process.

(6) The post-valve-open target charge amount required to restore the discharge reserve in correspondence with the target amount from when the safety valves 33 open, and charging of all the nickel metal hydride batteries is stopped after performing charging in correspondence with the post-valve-open target charge amount from when the safety valves 33 of all the battery modules 11 open. Thus, the timings at which the safety valves 33 open become close between the batteries, and the discharge reserve restores in correspondence with the target amount. This eliminates the need to perform, separately for each battery module 11, a process that performs charging in correspondence with the post-valve-open target charge amount after the safety valve 33 opens. This allows for simultaneous and efficient regeneration of the battery modules 11.

(7) The communication hole 32 of the partition wall 18 allows gas to flow between the battery jars 15 of the same battery module 11. Thus, when gas is generated in any battery jar 15 during overcharging, the charge amounts of the negative electrodes become uniform before the safety valves 33 open. Subsequently, opening of the safety valves 33 uniformly restores the discharge reserve of the batteries of the battery jars 15.

It should be apparent to those skilled in the art that the present invention may be embodied in many other specific forms without departing from the spirit or scope of the invention. Particularly, it should be understood that the present invention may be embodied in the following forms.

Figure 6:
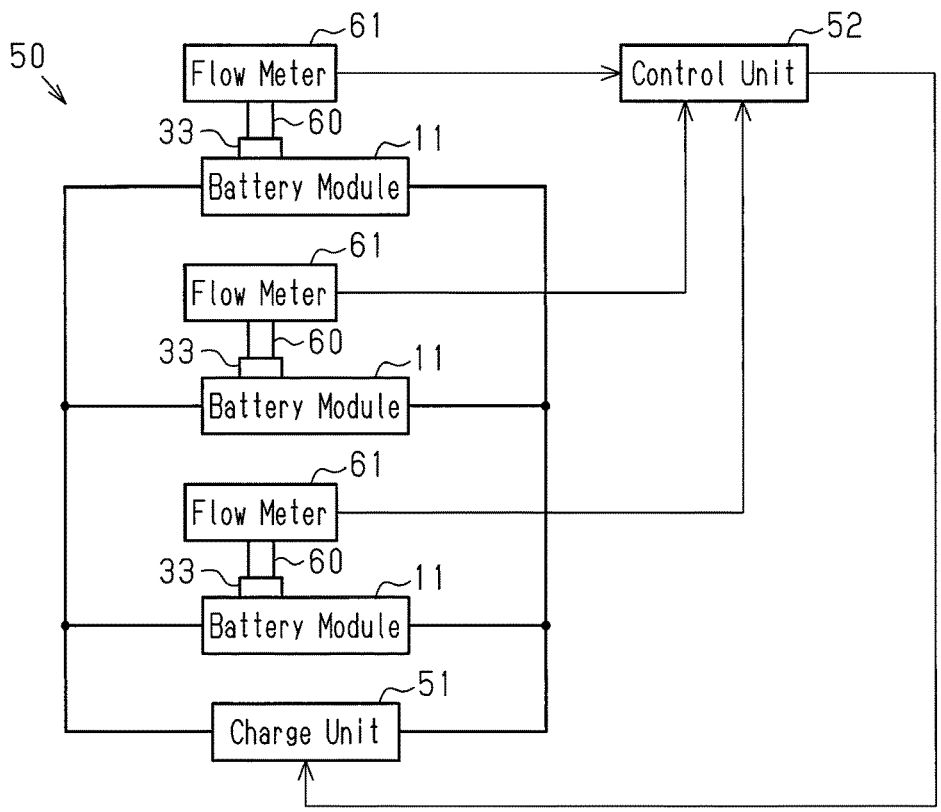
FIG. 6 is a schematic diagram showing the structure of a modified example of a regeneration device for a nickel metal hydride battery.
Figure 7:
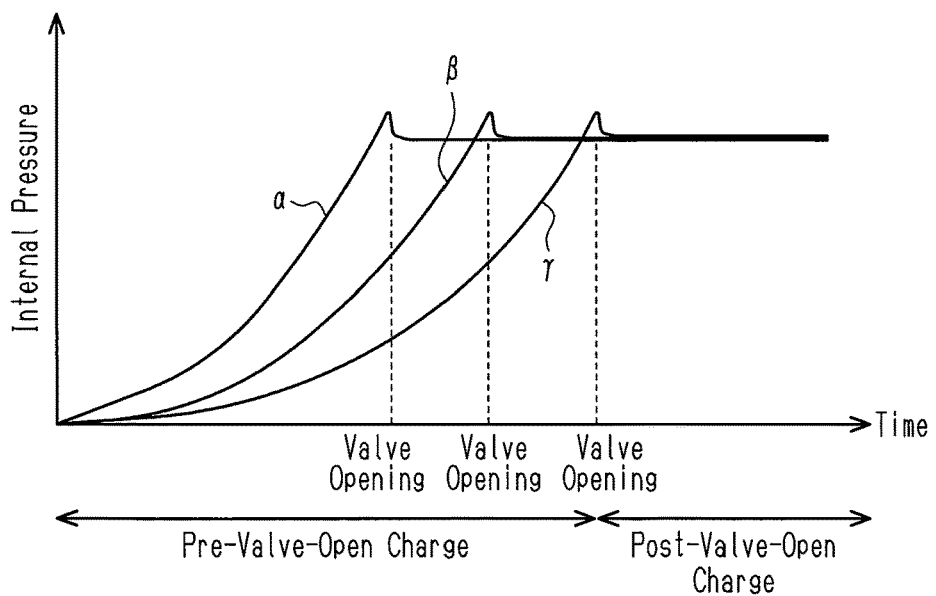
FIG. 7 is a schematic graph showing opening timings of safety valves when a nickel metal hydride battery is regenerated in the prior art.

As shown in FIG. 6, a flow meter 61 may be connected to the safety valve 33 of each battery module 11 by a hose 60 to detect opening of the safety valve 33. The flow meter 61 measures the flow rate of gas released from the safety valve 33. The control unit 52 determines that the safety valve 33 is open when the flow rate measured by the flow meter 61 is greater than or equal to a predetermined amount. Alternatively, an oxygen detector, a leak detector that detects the sound or the like when gas is released from the safety valve 33, or a valve opening detector such as an infrared camera may be used instead of the flow meter 61. When these measurement units are used, the hose 60 is not necessarily connected to the safety valve 33. The structure and method eliminate the need to perform a process that performs charging in correspondence with the valve opening target charge amount separately for each battery module 11. This allows for simultaneous and efficient regeneration of the battery modules 11.

In the above embodiment and other embodiments, the structure in which the partition wall 18 includes the communication hole 32 allows gas to flow between the battery jars 15 of the same battery module 11. Instead, each of the battery cells accommodated in the battery module 11 may include an independent safety valve 33, and the battery cells may be connected in series. Additionally, the battery module 11 may be connected in parallel. In this case, the valve opening timings are not the same between the battery cells connected in series. However, when the battery cells used under a similar environment are connected in series, the difference in deterioration may not be large between the battery cells. Thus, the valve opening timing is set to be constant to a certain extent.

In the above embodiment, it is determined that the positive electrode capacity decreases when the measurement voltage increase width $\Delta V$ of the battery module 11 becomes greater than or equal to the predetermined voltage increase width $\Delta V1$ before the safety valve 33 opens. However, it may be determined that the positive electrode capacity decreases when the voltage value becomes greater than or equal to a predetermined voltage value instead of the measurement voltage increase width $\Delta V$. Further, it is determined that an internal short circuit occurs when the voltage value V of the battery module 11 becomes less than or equal to the voltage decrease determination value V3. However, it may be determined that an internal short circuit occurs when the voltage decrease width per unit of time becomes greater than or equal to a predetermined decrease width. In addition, when the voltage value V of the battery module 11 becomes greater than or equal to the predetermined voltage value V3 after the safety valve 33 opens. However, it may be determined that the positive electrode capacity decreases when the measurement voltage increase width $\Delta V$ becomes greater than or equal to a predetermined increase width instead of the voltage value V.

In the above embodiment and other embodiments, constant current charging is performed for the battery modules 11 connected in parallel. However, charging other than constant current charging may be performed. For example, constant voltage charging may be performed, and charging that changes a current value or the like may be performed. Alternatively, constant current constant voltage charging that combines constant current charging and constant voltage charging may be performed. In this case, for example, constant voltage charging is performed after reaching a predetermined voltage through constant current charging. As another option, the charge unit 51 may be electrically separated from the battery terminal periodically, and pulse charging that performs charging with DC pulse current may be performed while monitoring release voltage of the battery module 11.

In the above embodiment and other embodiments, one safety valve 33 is provided for each battery module 11. Instead, a plurality of safety valves 33 may be provided for each battery module 11. In this case, for example, the timing at which two safety valves 33 of the battery module 11 open is a timing of valve opening in the battery module 11.

In the above embodiment, the regeneration method of the battery module is applied to the battery module 11 in which the battery cells 30 are connected in series. However, since negative electrode restriction can occur in the battery module 11 in which the battery cells 30 are connected in parallel, the above regeneration method may be applied to the battery module 11 in which the battery cells 30 are connected in parallel. Alternatively, when the battery cells 30 are connected in parallel, the regeneration method may be applied in the same manner as above or applied by connecting in parallel a plurality of battery modules 11 each including a battery cell 30 in which the battery cells 30 are connected in parallel.

In the above embodiment, the regeneration method of the battery module is applied to the battery modules 11 that form an assembled battery. However, the regeneration method of the battery module may be applied to a plurality of battery modules that does not form an assembled battery.

In each of the above embodiments, the regeneration method and the regeneration device for a nickel metal hydride battery are applied to the battery module 11 used as a power source of an electric vehicle and a hybrid vehicle. However, the regeneration method and the regeneration device for a nickel metal hydride battery may be applied to a battery module 11 used as a power supply of other devices.

The present examples and embodiments are to be considered as illustrative and not restrictive, and the invention is not to be limited to the details given herein, but may be modified within the scope and equivalence of the appended claims.

The invention claimed is:

1. A method for regenerating a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, the method comprising:
- connecting a plurality of nickel metal hydride batteries in parallel, wherein each nickel metal hydride battery is formed by integrating one or more battery cells;
- overcharging the nickel metal hydride batteries by supplying current from a charge unit that is connected in parallel to the nickel metal hydride batteries; and
- when each nickel metal hydride battery is overcharged, restoring a discharge reserve of a negative electrode of the overcharged nickel metal hydride battery by releasing at least some of an oxygen gas generated at a positive electrode of the overcharged nickel metal hydride battery out of the battery case through the safety valve,
- wherein a switch is arranged between each nickel metal hydride battery and the charge unit to connect and disconnect the corresponding nickel metal hydride battery and the charge unit, and each nickel metal hydride battery includes a voltage measurement unit that measures voltage between terminals of the corresponding nickel metal hydride battery, the method further comprising:
- setting in advance a voltage increase width per unit of time before the safety valve opens in the nickel metal hydride battery that has a decreased positive electrode capacity; and
- when a voltage increase width of a voltage value measured by at least one of the voltage measurement units is greater than or equal to the set voltage increase width during charging of the nickel metal hydride batteries, stopping charging of the corresponding nickel metal hydride battery.

2. The method according to claim 1, wherein the overcharging the nickel metal hydride batteries includes performing, with the charge unit, constant current charging that supplies a constant current to the nickel metal hydride batteries, constant voltage charging that applies a constant voltage to the nickel metal hydride batteries, or constant current-constant voltage charging that combines the constant current charging and the constant voltage charging.

3. The method according to claim 1, further comprising:
- setting in advance a target post-valve-open charge amount that is required to restore a discharge reserve in correspondence with a target amount after the safety valve opens;
- stopping charging of all of the nickel metal hydride batteries after performing charging in correspondence with the target post-valve-open charge amount after the safety valves of all the nickel metal hydride batteries open.

4. The method according to claim 1, wherein each nickel metal hydride battery is formed by integrating battery cells, wherein each nickel metal hydride battery includes an integrated battery jar that accommodates the battery cells with a partition wall, the method further comprising:
- providing the partition wall with a communication hole so that oxygen gas generated from each battery cell that is overcharged flows in the integrated battery jar through the communication hole.

5. A regeneration device for a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, wherein
- nickel metal hydride batteries are connected in parallel, and each nickel metal hydride battery is formed by integrating one or more battery cells,
- the regeneration device comprising:
- a charge unit connected in parallel to the nickel metal hydride batteries, wherein the charge unit supplies current, and
- a control unit that controls supply and interruption of current from the charge unit, and
- the control unit is configured to have the charge unit supply current and overcharge the nickel metal hydride batteries, and when each nickel metal hydride battery is overcharged, restore a discharge reserve of a negative electrode by releasing at least some of an oxygen gas generated at a positive electrode out of the battery case through the safety valve,
- wherein a switch is arranged between each nickel metal hydride battery and the charge unit to connect and disconnect the corresponding nickel metal hydride battery and the charge unit, and each nickel metal hydride battery includes a voltage measurement unit that measures voltage between terminals of the corresponding nickel metal hydride battery,
- the control unit is further configured to perform:
- setting in advance a voltage increase width per unit of time before the safety valve opens in the nickel metal hydride battery that has a decreased positive electrode capacity; and
- when a voltage increase width of a voltage value measured by at least one of the voltage measurement units is greater than or equal to the set voltage increase width during charging of the nickel metal hydride batteries, stopping charging of the corresponding nickel metal hydride battery.

6. A method for regenerating a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, the method comprising:
- connecting a plurality of nickel metal hydride batteries in parallel, wherein each nickel metal hydride battery is formed by integrating one or more battery cells;
- overcharging the nickel metal hydride batteries by supplying current from a charge unit that is connected in parallel to the nickel metal hydride batteries; and
- when each nickel metal hydride battery is overcharged, restoring a discharge reserve of a negative electrode of the overcharged nickel metal hydride battery by releasing at least some of an oxygen gas generated at a positive electrode of the overcharged nickel metal hydride battery out of the battery case through the safety valve,
- wherein a switch is arranged between each nickel metal hydride battery and the charge unit to connect and disconnect each nickel metal hydride battery and the charge unit, and each nickel metal hydride battery includes a voltage measurement unit that measures voltage between terminals of the corresponding nickel metal hydride battery, the method further comprising:
- setting in advance a voltage increase determination value for a voltage value of the nickel metal hydride battery having a decreased positive electrode capacity, wherein the voltage increase determination value is used to determine a voltage increase behavior after the safety valve opens; and when a voltage value measured by at least one of the voltage measurement units is greater than or equal to the set voltage increase determination value during charging of the nickel metal hydride batteries, stopping charging of the corresponding nickel metal hydride battery.

7. A method for regenerating a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, the method comprising:

connecting a plurality of nickel metal hydride batteries in parallel, wherein each nickel metal hydride battery is formed by integrating one or more battery cells;

overcharging the nickel metal hydride batteries by supplying current from a charge unit that is connected in parallel to the nickel metal hydride batteries; and when each nickel metal hydride battery is overcharged, restoring a discharge reserve of a negative electrode of the overcharged nickel metal hydride battery by releasing at least some of an oxygen gas generated at a positive electrode of the overcharged nickel metal hydride battery out of the battery case through the safety valve, wherein a switch is arranged between each nickel metal hydride battery and the charge unit to connect and disconnect each nickel metal hydride battery and the charge unit, and each nickel metal hydride battery includes a voltage measurement unit that measures voltage between terminals of the corresponding nickel metal hydride battery, the method further comprising:

setting in advance a voltage decrease determination value used to determine a voltage decrease behavior of the nickel metal hydride battery in which an internal short circuit occurs; and when a voltage value measured by at least one of the voltage measurement units is less than or equal to the set voltage decrease determination value during charging of the nickel metal hydride batteries, stopping charging of the corresponding nickel metal hydride battery.

8. A regeneration device for a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, wherein nickel metal hydride batteries are connected in parallel, and each nickel metal hydride battery is formed by integrating one or more battery cells, the regeneration device comprising:

a charge unit connected in parallel to the nickel metal hydride batteries, wherein the charge unit supplies current, and a control unit that controls supply and interruption of current from the charge unit, and the control unit is configured to have the charge unit supply current and overcharge the nickel metal hydride batteries, and when each nickel metal hydride battery is overcharged, restore a discharge reserve of a negative electrode by releasing at least some of an oxygen gas generated at a positive electrode out of the battery case through the safety valve, wherein a switch is arranged between each nickel metal hydride battery and the charge unit to connect and disconnect each nickel metal hydride battery and the charge unit, and each nickel metal hydride battery includes a voltage measurement unit that measures voltage between terminals of the corresponding nickel metal hydride battery, the control unit is further configured to perform:

setting in advance a voltage increase determination value for a voltage value of the nickel metal hydride battery having a decreased positive electrode capacity, wherein the voltage increase determination value is used to determine a voltage increase behavior after the safety valve opens; and when a voltage value measured by at least one of the voltage measurement units is greater than or equal to the set voltage increase determination value during charging of the nickel metal hydride batteries, stopping charging of the corresponding nickel metal hydride battery.

9. A regeneration device for a nickel metal hydride battery, wherein the nickel metal hydride battery includes a hydrogen absorbing alloy that serves as a negative electrode material and a safety valve that opens when an internal pressure of a battery case is greater than or equal to a predetermined pressure, wherein nickel metal hydride batteries are connected in parallel, and each nickel metal hydride battery is formed by integrating one or more battery cells, the regeneration device comprising:

a charge unit connected in parallel to the nickel metal hydride batteries, wherein the charge unit supplies current, and a control unit that controls supply and interruption of current from the charge unit, and the control unit is configured to have the charge unit supply current and overcharge the nickel metal hydride batteries, and when each nickel metal hydride battery is overcharged, restore a discharge reserve of a negative electrode by releasing at least some of an oxygen gas generated at a positive electrode out of the battery case through the safety valve, wherein a switch is arranged between each nickel metal hydride battery and the charge unit to connect and disconnect each nickel metal hydride battery and the charge unit, and each nickel metal hydride battery includes a voltage measurement unit that measures voltage between terminals of the corresponding nickel metal hydride battery, the control unit is further configured to perform:

setting in advance a voltage decrease determination value used to determine a voltage decrease behavior of the nickel metal hydride battery in which an internal short circuit occurs; and when a voltage value measured by at least one of the voltage measurement units is less than or equal to the set voltage decrease determination value during charging of the nickel metal hydride batteries, stopping charging of the corresponding nickel metal hydride battery.

* * * * *